United States Patent [19]

Krage et al.

[11] Patent Number: 4,711,481
[45] Date of Patent: Dec. 8, 1987

[54] VEHICLE IMPACT ATTENUATING DEVICE

[75] Inventors: William G. Krage, Fair Oaks; Barry D. Stephens, Citrus Heights; Owen S. Denman, Roseville, all of Calif.

[73] Assignee: Energy Absorption Systems, Inc., Chicago, Ill.

[21] Appl. No.: 791,298

[22] Filed: Oct. 25, 1985

[51] Int. Cl.[4] ............................................. B60R 19/34
[52] U.S. Cl. .................................. 293/133; 188/371; 188/377; 256/13.1
[58] Field of Search ............ 267/116, 139, 140, 140.3, 267/140.4, 152, 153; 213/220, 221; 188/371–377, 378; 293/1, 102, 109, 110, 133, 132; 248/548, 499; 74/492; 296/188, 189; 114/219; 256/13.1; 404/6, 9, 10

[56] References Cited

U.S. PATENT DOCUMENTS

| | | | |
|---|---|---|---|
| 3,587,787 | 6/1971 | Rich et al. | 188/375 |
| 3,643,924 | 2/1972 | Fitch | 256/13.1 |
| 3,702,202 | 11/1972 | Rumsey | 293/133 X |
| 3,944,187 | 3/1976 | Walker | 256/13.1 |
| 3,972,390 | 8/1976 | Melton et al. | 293/133 X |
| 3,981,486 | 9/1976 | Baumann | 256/13.1 |
| 3,982,734 | 9/1976 | Walker | 256/13.1 |
| 4,008,915 | 2/1977 | Walker | 293/60 |
| 4,029,350 | 6/1977 | Goupy et al. | 293/133 |
| 4,118,014 | 10/1978 | Frosch et al. | 256/13.1 X |
| 4,154,469 | 5/1979 | Goupy et al. | 293/120 |
| 4,399,980 | 8/1983 | van Schie | 256/13.1 |
| 4,423,854 | 1/1984 | Cobb et al. | 256/13.1 |
| 4,452,431 | 6/1984 | Stephens et al. | 256/13.1 |
| 4,635,981 | 1/1987 | Friton | 293/1 |

FOREIGN PATENT DOCUMENTS 2437336 4/1980 France .

*Primary Examiner*—Douglas C. Butler
*Attorney, Agent, or Firm*—Willian Brinks Olds Hofer Gilson & Lione Ltd.

[57] ABSTRACT

A vehicle mounted crash attenuator includes an array of parallel diaphragms. A set of cell assemblies is interposed between adjacent diaphragms, and each cell assembly is formed of two L-shaped sheet metal components which are riveted together to form a rectangular column extending between the adjacent diaphragms. These columns are cross braced by ribbed braces which extend diagonally between adjacent columns. These cross braces stabilize the columns against long column buckling and promote short column buckling, thereby increasing the energy absorbing capability of the columns.

26 Claims, 9 Drawing Figures

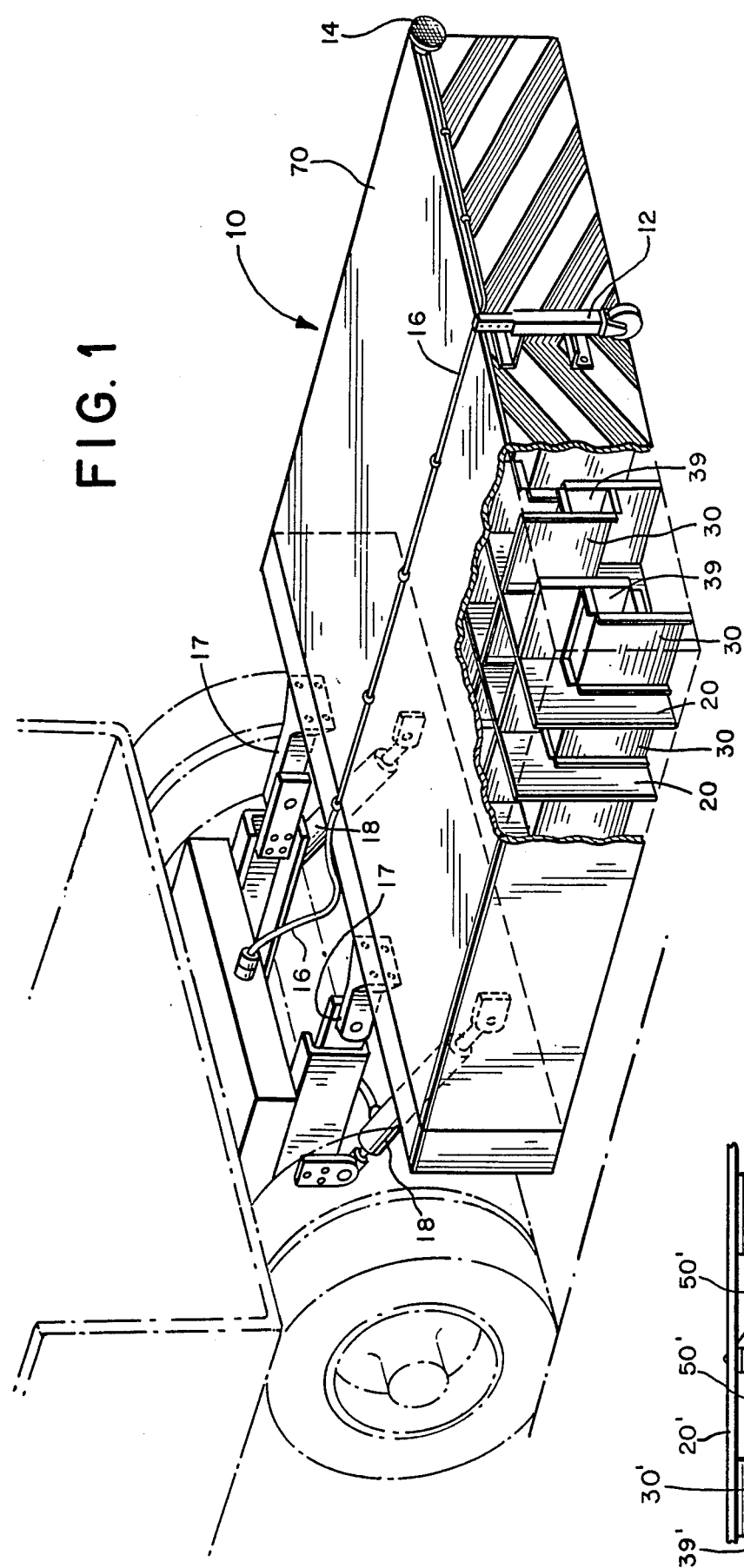
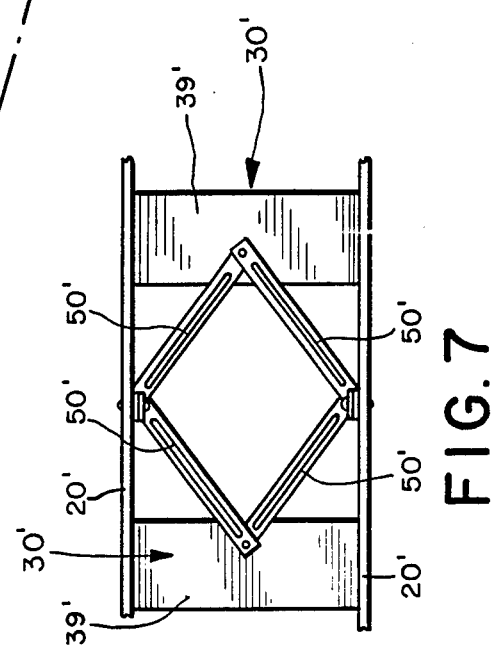

(BAY 1, 2, 3, AND 4)

(BAY 5 AND 6)

(BAY 7)

VEHICLE IMPACT ATTENUATING DEVICE

BACKGROUND OF THE INVENTION

The present invention relates to an improved energy absorbing device of the type adapted to decelerate an impacting vehicle.

A wide variety of crash attenuators have been used to decelerate an impacting vehicle which has left a highway, including attenuators based on dispersible inertial materials such as sand, valved fluids such as water, disintegrating materials such as vermiculite, and buckling columns. The present invention relates particularly to the last of these approaches.

U.S. Pat. No. 4,339,980 (Van Schie) discloses a crash attenuator which includes spaced apart crumple tubes which buckle to absorb the kinetic energy of a decelerating vehicle. However, these crumple tubes are relatively long and are not diagonally braced, and they often fail in a long column rather than a short column buckling mode. Long column buckling absorbs less energy than short column buckling, and long column buckling is therefore a relatively inefficient failure mode for an energy absorbing element of a crash attenuator.

U.S. Pat. Nos. 4,029,350 (Goupy), 4,154,469 (Goupy) and 4,118,014 (Frosch) all disclose crash attenuators which utilize densely packed columns arranged to buckle in response to a vehicle impact. Because the columns are closely packed rather than spaced apart as in the embodiments described below, it is not possible to use identical columns throughout the crash attenuator while varying the deformability of the attenuator in either the width or the length dimension. As explained below, there are important advantages in readily being able to vary the resistance to deformation of the crash attenuator in both dimensions.

U.S. Pat. No. 4,635,981 (Friton), assigned to the assignee of the present invention, discloses a truck mounted attenuator having an array of parallel diaphragms with foam filled cells situated between the diaphragms.

SUMMARY OF THE INVENTION

According to one aspect of this invention, an energy absorbing device adapted to decelerate an impacting vehicle is provided which comprises a first diaphragm, and at least one second diaphragm spaced from the first diaphragm along an axial direction. At least one pair of spaced apart, collapsible columns, each aligned in the axial direction, is interposed between the first and second diaphragms such that forces applied to the first diaphragm during deceleration of an impacting vehicle cause the columns to buckle. Means are provided for bracing the columns diagonally with respect to the axial direction to stabilize the columns against long column buckling and to promote short column buckling of the columns.

According to another aspect of this invention, a vehicle impact attenuating device is provided which comprises an array of spaced parallel diaphragms, each oriented transversely to an anticipated impact direction. An array of energy absorbing elements is secured between adjacent pairs of the diaphragms, and each of these elements comprises a set of separately formed, planar panels secured together to form a tubular column extending between the adjacent pair of diaphragms. These columns are oriented transverse to the diaphragms to buckle in response to an impact of a first vehicle traveling along the impact direction in order to decelerate the first vehicle. Means, separate from the planar panels, are provided for covering the diaphragms and the columns, and means are provided for supporting the diaphragms and the energy absorbing elements as a unit from a second vehicle to protect the second vehicle from impact with the first vehicle.

The preferred embodiments described below provide important advantages in terms of economy of manufacture and efficiency of operation. The L-shaped planar panels of this embodiment can readily be folded from sheet stock, and do not require elaborate fabrication techniques. The diagonal bracing means stabilizes the columns against long column buckling and promotes short column buckling of the columns. Short column buckling absorbs significantly more energy than long column buckling, and for this reason the bracing means materially enhances the efficiency of operation of this embodiment. The preferred embodiment described below avoids the need to use foam, granular material or collapsible material within the columns, thereby further reducing the weight of the device.

The invention itself, together with further objects and attendant advantages, will best be understood by reference to the following detailed description, taken in conjunction with the accompanying drawings.

BRIEF DESCRIPTION OF THE DRAWINGS

FIG. 1 is a perspective view in partial cutaway of a crash attenuator which incorporates a presently preferred embodiment of this invention;

FIG. 7 is a sectional view of a portion of a crash attenuator which incorporates a second preferred embodiment of this invention.

DETAILED DESCRIPTION OF THE PRESENTLY PREFERRED EMBODIMENTS

Figure 2:
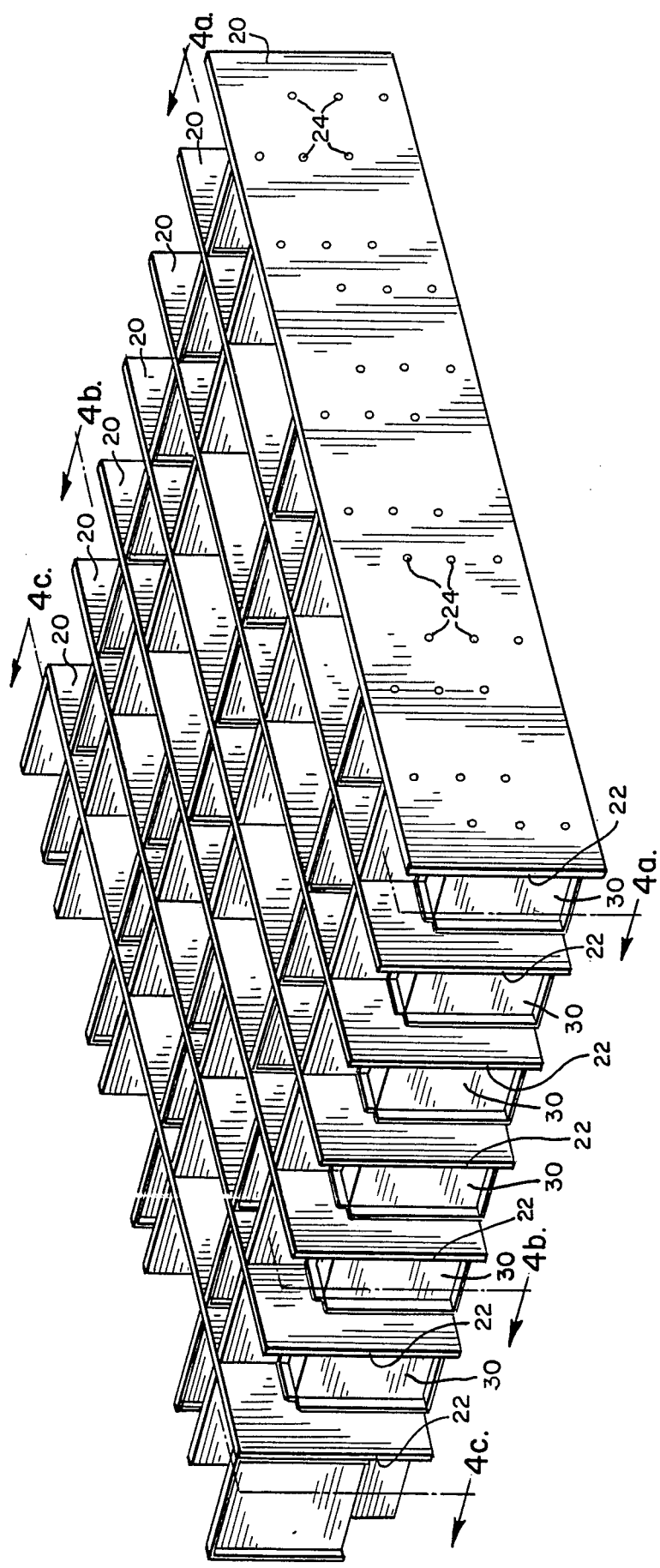
FIG. 2 is a perspective view of the crash attenuator of FIG. 1 with the outer skin removed.

Turning now to the drawings, FIG. 1 shows a perspective view of a crash attenuator 10 which incorporates a presently preferred embodiment of this invention. This attenuator 10 is intended to be mounted to the rear of a vehicle such as a highway maintenance truck. For this reason, the attenuator 10 includes a rear jack assembly 12 which can be lowered to support the rear end of the attenuator 10. The attenuator 10 also includes a pair of tail lights 14 which can be coupled to the vehicle via a wire harness 16. Conventional means including hinged tabs 17 and hydraulic struts 18 are used to secure the forward end of the crash attenuator 10 to the rearward end of the vehicle.

As best shown in FIG. 2, the attenuator 10 in this embodiment includes seven separate diaphragms 20, each of which is bent to define a peripheral flange 22 extending around the entire perimeter of the diaphragm 20. The diaphragms 20 create in this embodiment seven separate bays, numbered one (nearest the tail lights 14) to seven (farthest from the tail lights 14).

Figure 3:
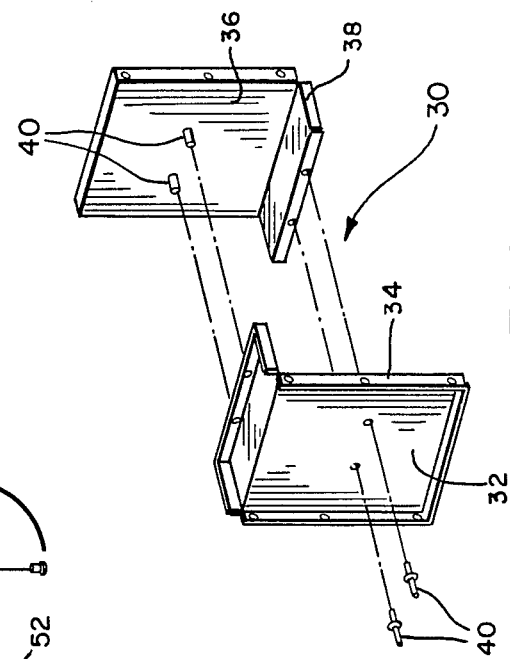
FIG. 3 is an exploded perspective view of one of the energy absorbing elements of the embodiment of FIG. 1.

A number of cell assemblies 30 are interposed between adjacent ones of the diaphragms 20 and are securely and rigidly fastened in place. As best shown in FIG. 3, each of the cell assemblies 30 is made up of a first L-shaped component 32 and a second L-shaped component 36. The first and second components 32,36 each define peripheral flanges 34,38, respectively. A total of four rivets 40 are used to secure the first and second components 32,36 together such that they cooperate to form a tubular column 39 extending between the adjacent diaphragms (FIGS. 5 and 6).

Figure 4A:
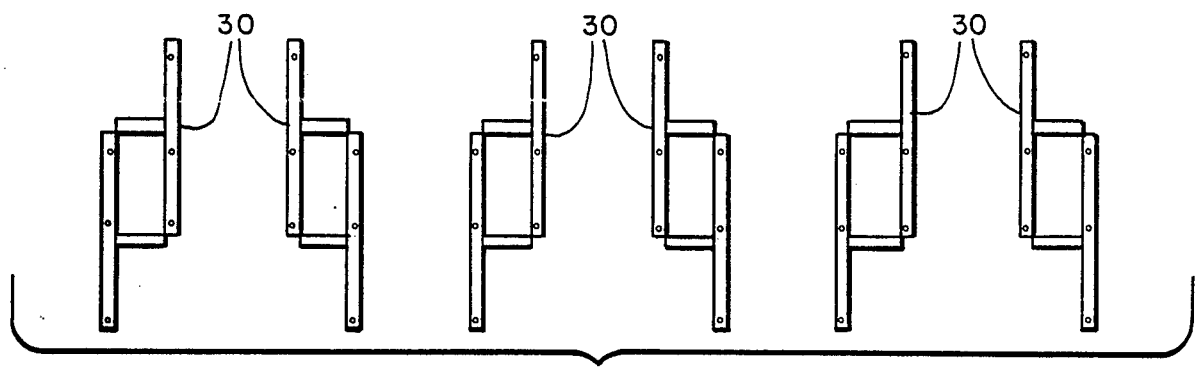
FIGS. 4a, 4b and 4c are sectional views taken along lines 4a—4a, 4b—4b and 4c—4c of FIG. 2, respectively.
Figure 4B:
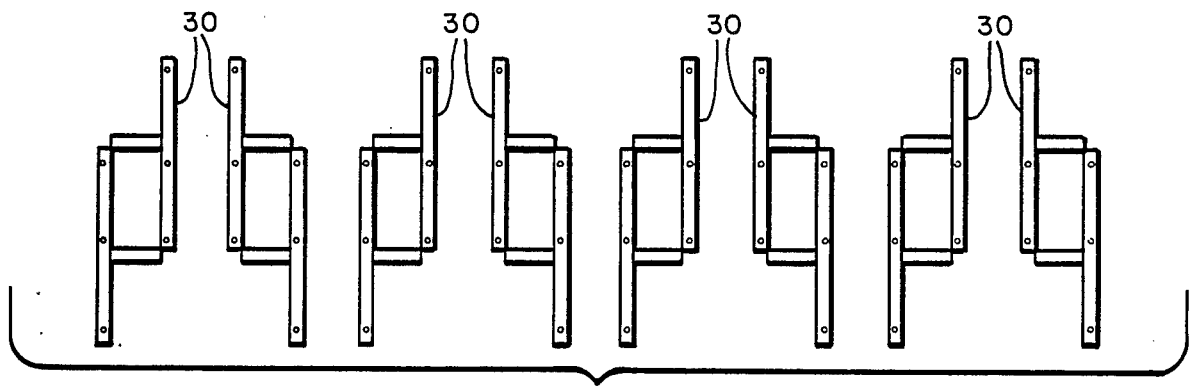
Figure 4C:
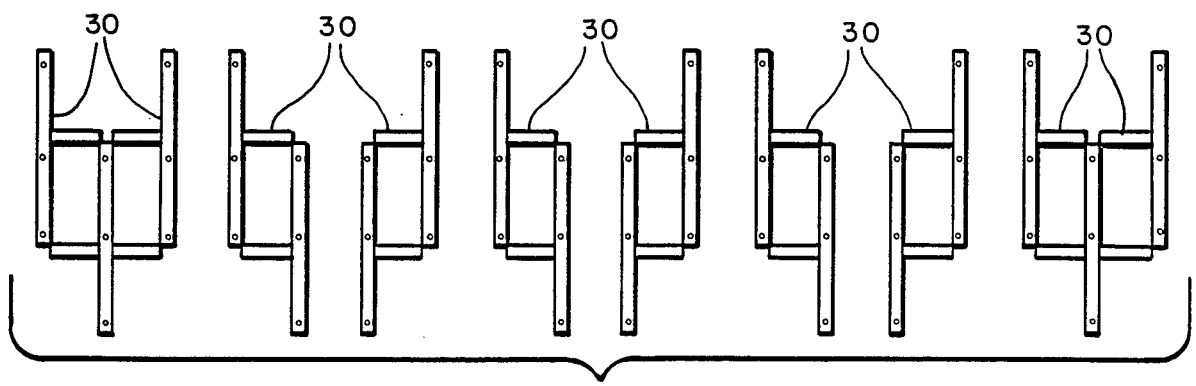

FIGS. 4a, 4b and 4c show the distribution of the cell assemblies 30 in the attenuator 10. As shown in FIG. 4a, bays one, two, three and four each comprise six separate cell assemblies 30. As shown in FIG. 4b bays five and six include eight separate cell assemblies 30, and as shown in FIG. 4c bay seven includes ten separate cell assemblies 30. Each of the cell assemblies 30 is riveted in place to the adjacent diaphragms 20 by rivets 24. In this embodiment, a total of six rivets are used on each cell at each diaphragm (FIG. 2).

Figure 5:
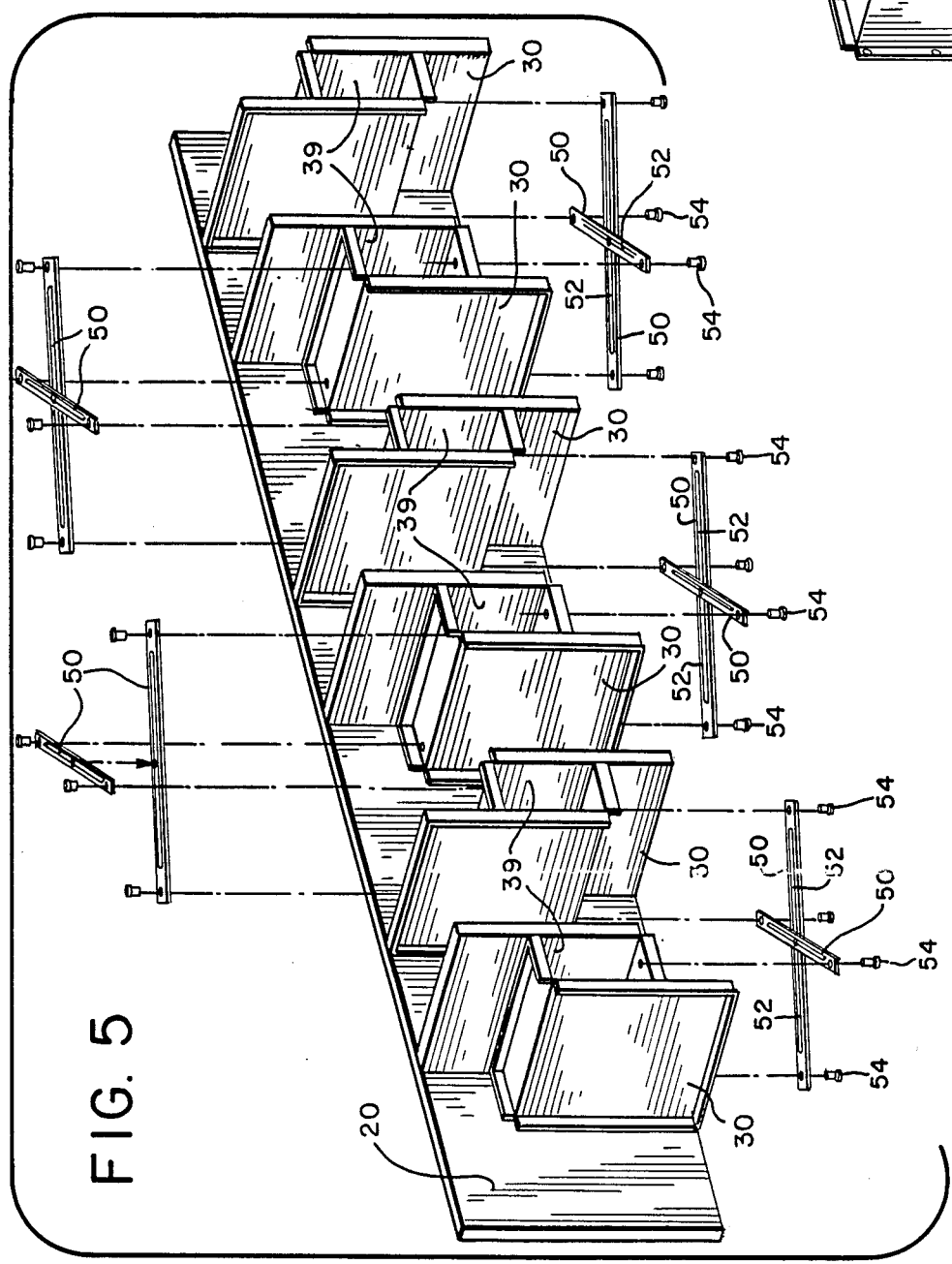
FIG. 5 is an exploded perspective view of bay 1 of the embodiment of FIG. 1.
Figure 6:
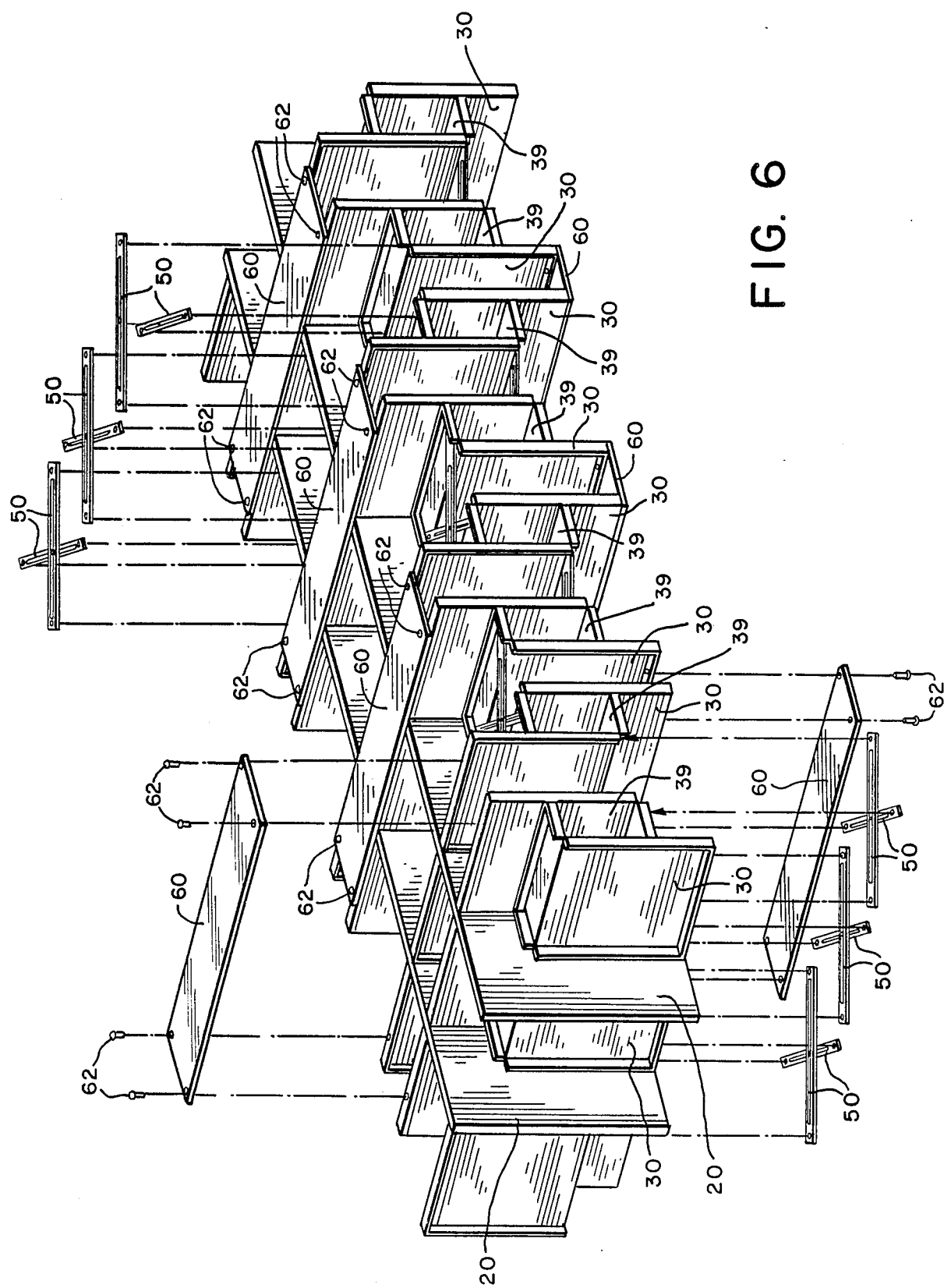
FIG. 6 is an exploded perspective view of bays 5-7 of the embodiment of FIG. 1.

As best shown in FIGS. 5 and 6, adjacent cell assemblies 30 are diagonally braced with respect to one another by cross braces 50. Each of the cross braces 50 includes a stamped rib 52, and each of the braces 50 is secured at each end to a respective one of cell assemblies 30 by a rivet 54. As shown in FIG. 5, in bays one through four there are a total of four cross braces 50 at the top of each bay and a total of six cross braces at the bottom of each bay. As shown in FIG. 6, in bays five through seven there are a total of six cross braces 50 in the top of each bay and a total of eight cross braces in the bottom of each bay. In addition, as shown in FIG. 6 a plurality of longitudinally extending plates 60 are provided, each of which is held in position by respective rivets 62 to respective ones of the cell assemblies 30.

Returning to FIG. 1, the entire crash attenuator 10 is enclosed in a skin 70 which is riveted to the peripheral flanges 22 of the diaphragms 20 and to the peripheral flanges 34,38 of the first and second components 32,36 (FIG. 3). Preferably, the skin 70 is made substantially airtight such that the attenuator 10 tends to compress the air contained therein as it collapses.

In operation, the columns 39 defined by the cell assemblies 30 operate to absorb energy efficiently during an impact. In particular, the braces 50 and the plates 60 stabilize the columns 39 against long column buckling, and thereby promote short column buckling. Short column buckling absorbs significantly greater energy in the deformation of the columns than long column buckling, and thus the braces 50 and plates 60 significantly increase the energy absorbing capability of the attenuator 10. This results in a reduction in the materials, weight and cost of the attenuator 10 for a given energy absorbing capability. Furthermore, the attenuator 10 can be fabricated using remarkably simple manufacturing techniques. In particular, the cell assemblies 30, the diaphragms 20, and the skin 70 are simply formed from folded pieces of sheet metal. No complex forming techniques are utilized, and simple cutting, folding and riveting operations are all that are required for assembly.

As yet another advantage, the attenuator 10 spaces the columns laterally apart from one another, thereby allowing the columns to be placed properly for optimum effect. In particular, this arrangement allows a lower density of columns in bays one, two, three and four than in bays five, six and seven. It also permits bay seven to be provided with a higher density of columns near the lateral edges than near the center line of the attenuator 10. This distribution of columns tends to center an impacting vehicle and to prevent it from moving off to either side during the impact. Furthermore, by laterally spacing the columns, low rigidity attenuators can readily be provided to ensure that vehicle deceleration is not excessive.

The following information is provided in order better to define the presently preferred embodiment of this invention. However, it should be clearly understood that this information is intended merely by way of example, and is not intended in any way to limit this invention. In this embodiment, the top and bottom of the skin 70, the cell assemblies 30, the diaphragms 20, the cross braces 50 and the plates 60 are all formed of Type 5052 sheet aluminum, in a thickness of 0.032 inch. The sides of the skin 70 are formed of the same alloy in a thickness of 0.062 inch. In this embodiment the rivets are large flange, 3/16 inch diameter aluminum rivets and the overall dimensions of the attenuator 10 are about 7 feet 9 inches in width, 6 feet 9½ inches in length, and 1 foot 10½ inches in height. The cell assemblies 30 extend completely between the upper and lower edges of the diaphragms 20, and the columns 39 formed by the cell assemblies 30 are positioned midway between the upper and lower edges of the diaphragms 20. Preferably a structural adhesive is used between the flanges 22 and the top and bottom of the skin 70, between the plates 60 and the flanges 34,38, and between the rear of the attenuator 10 and the strongback used to mount the attenuator to the vehicle. A urethane adhesive such as 3M Scotch-Weld #3532 B/A has been found suitable.

FIG. 7 is a sectional view of a portion of a second preferred embodiment of this invention, which includes diaphragms 20' and cell assemblies 30' similar to those described above. In this embodiment, the cell assemblies 30' define columns 39' which are diagonally braced against long column buckling by cross braces 50' which extend diagonally between the columns 39' and the adjacent diaphragms 20'. These cross braces 50' provide the same advantages as the cross braces 50 described above.

Of course, it should be understood that a wide range of changes and modifications can be made to the preferred embodiments described above. For example, the cross braces 50 can be embodied as plates extending between adjacent columns 38. Alternately, the cross braces 50 can be formed as cables. Furthermore, it may be preferable in some applications to provide cross braces between columns which are situated adjacent to one another rather than being spaced from one another as shown in FIGS. 1-6. Of course, it should be understood that the present invention is not limited to use with vehicle mounted attenuators of the type shown. To the contrary, this invention can readily be adapted for use with roadside impact attenuators, such as those shown, for example, in U.S. Pat. No. 3,944,187 (Walker) and U.S. Pat. No. 4,452,431 (Stephens et al.), both assigned to the assignee of the present invention. When adapted for such applications, the attenuator of this invention may include only a single pair of diaphragms and may be configured as an insert adapted to be used with a separately fabricated frame. In some applications, it may be preferable to substitute cross braced cylindrical columns for the cross braced sheet metal columns described above. In addition, materials, proportions and dimensions can all be adapted as required for the particular application. It is therefore intended that the foregoing detailed description be regarded as illustrative rather than limiting, and that it be understood that it is the following claims, including all equivalents, which are intended to define the scope of this invention.

I claim:

1. An energy absorbing device adapted to decelerate an impacting vehicle, said device comprising:
   a first diaphragm;
   a second diaphragm, spaced from the first diaphragm along an axial direction;
   at least one pair of spaced apart, collapsible columns, each aligned with the axial direction and interposed between the first and second diaphragms such that forces applied to the first diaphragm during deceleration of an impacting vehicle cause the columns to buckle; and
   means for bracing the columns diagonally with respect to the axial direction to stabilize the columns against long column buckling and to promote short column buckling of the columns, thereby enhancing energy adsorption efficiency of the device.

2. The invention of claim 1 wherein the bracing means comprises at least one brace secured to each of the columns and extending diagonally with respect to the axial direction.

3. The invention of claim 2 wherein the brace comprises a diagonally oriented strut secured to the columns.

4. The invention of claim 2 wherein the at least one brace comprises a pair of braces arranged in a cruciform pattern, each brace extending diagonally with respect to the axial direction and secured between two of the columns.

5. The invention of claim 2 wherein the brace comprises a plate oriented perpendicularly to the diaphragms and secured to the columns at diagonally situated points.

6. The invention of claim 1 wherein the bracing means comprises at least one brace secured between the columns and one of the diaphragms and extending diagonally with respect to the axial direction.

7. The invention of claim 6 wherein the brace comprises a diagonally oriented strut secured to one of the diaphragms and to the column.

8. The invention of claim 1 wherein each of the columns comprises a set of planar panels secured between the first and second diaphragms.

9. The invention of claim 8 wherein each of the sets of planar panels comprises first and second L-shaped components secured together to form the column extending between the diaphragms.

10. The invention of claim 9 wherein each of the diaphragms defines an upper edge and a lower edge, wherein each of the first components extends to the upper edges of the adjacent diaphragms, wherein each of the second components extends to the lower edges of the adjacent diaphragms, and wherein each of the columns is positioned substantially midway between the upper and lower edges of the adjacent diaphragms.

11. The invention of claim 10 wherein the bracing means comprises a pair of diagonally oriented struts arranged in a cruciform pattern and secured to each of the columns.

12. A vehicle impact attenuating device comprising:
    an array of spaced, parallel diaphragms, each oriented transversely to an axial direction;
    an array of sets of laterally spaced apart, energy absorbing columns, each column secured between an adjacent pair of diaphragms and aligned with the axial direction such that forces applied to the diaphragms during deceleration of an impacting vehicle cause the columns to buckle; and
    means for bracing the columns diangonally with respect to the axial direction to stabilize the columns against long column buckling and to promote short column buckling of the columns, thereby enhancing energy absorption efficiency of the device.

13. The invention of claim 12 wherein the bracing means comprises an array of braces secured to the columns to extend between the columns diagonally with respect to the axial direction.

14. The invention of claim 13 wherein each of the braces comprises a respective diagonally oriented strut.

15. The invention of claim 12 wherein each of the braces comprises a respective plate oriented perpendicular to the diaphragms and secured to at least two of the columns at diagonally aligned points.

16. The invention of claim 12 wherein the bracing means comprises a plurality of pairs of braces, each pair arranged in a cruciform pattern and each brace secured between two adjacent ones of the columns.

17. The invention of claim 12 wherein the bracing means comprises an array of braces, each secured to one of the columns and an adjacent one of the diaphragms to extend diagonally with respect to the axial direction.

18. The invention of claim 17 wherein each of the braces comprises a respective diagonally oriented strut.

19. The invention of claim 12 wherein each of the columns comprises a respective set of planar panels secured between the adjacent diaphragms.

20. The invention of claim 19 wherein each of the sets of panels comprises first and second L-shaped components secured together to form the respective column.

21. The invention of claim 20 wherein each of the diaphragms defines an upper edge and a lower edge, wherein the first components extend to the upper edges of the adjacent diaphragms, wherein the second components extend to the lower edges of the adjacent diaphragms, and wherein the columns are positioned substantially midway between the upper and lower edges of the adjacent diaphragms.

22. The invention of claim 21 wherein the bracing means comprises a plurality of pairs of diagonally oriented struts arranged in a cruciform pattern and secured between adjacent columns.

23. A vehicle impact attenuating device comprising:
    an array of spaced, parallel diaphragms, each oriented transversely to an anticipated impact direction;
    an array of energy absorbing elements, each secured between an adjacent pair of diaphragms, each of said energy absorbing elements comprising a set of separately formed planar panels secured together to form a tubular column extending between the adjacent pair of diaphragms, said columns oriented transverse to the diaphragms to buckle in response to an impact of a first vehicle traveling along the impact direction in order to decelerate the first vehicle;
    means, separate from the planar panels, for covering the diaphragms and the columns; and means for supporting the diaphragms and the energy absorbing elements as a unit from a second vehicle to protect the second vehicle from impact with the first vehicle.

24. The invention of claim 23 wherein each of the sets of planar panels comprises first and second L-shaped components secured together to form the tubular column extending between the adjacent diaphragms.

25. The invention of claim 24 wherein each of the diaphragms defines an upper edge and a lower edge, wherein the first components extend to the upper edges of the adjacent diaphragms, wherein the second components extend to the lower edges of the adjacent diaphragms, and wherein the columns are positioned substantially midway between the upper and lower edges of the adjacent diaphragms.

26. The invention of claim 25 further comprising a plurality of cross braces oriented obliquely with respect to the diaphragms and interconnected between adjacent columns to brace the columns against long column buckling and to increase tendency of the columns to fail in short column buckling during the impact, thereby enhancing energy absorption efficiency of the device.

* * * * *

UNITED STATES PATENT AND TRADEMARK OFFICE
CERTIFICATE OF CORRECTION

PATENT NO. : 4,711,481

DATED : December 8, 1987

INVENTOR(S) : William G. Krage et al.

It is certified that error appears in the above-identified patent and that said Letters Patent is hereby corrected as shown below:

IN THE CLAIMS

In claim 1 (column 5, line 25), please delete "adsorption" and substitute therefor --absorption--.

In claim 12 (column 6, line 9), please delete "diangonally" and substitute therefor --diagonally--.

In claim 26 (column 8, line 9), please insert "the" before "tendency" and after "increase".

Signed and Sealed this

Seventh Day of March, 1989

Attest:

DONALD J. QUIGG

Attesting Officer

Commissioner of Patents and Trademarks